Oct. 15, 1940.   C. J. BASSLER   2,217,855
SYSTEM FOR MEASURING LIQUIDS
Filed Jan. 26, 1937.   4 Sheets-Sheet 1

INVENTOR.
Carlos J. Bassler
BY Earl E Moore
ATTORNEY

Oct. 15, 1940.  C. J. BASSLER  2,217,855
SYSTEM FOR MEASURING LIQUIDS
Filed Jan. 26, 1937  4 Sheets-Sheet 2

INVENTOR.
Carlos J. Bassler
BY Earl E. Moore
ATTORNEY

Oct. 15, 1940.                  C. J. BASSLER                  2,217,855
                        SYSTEM FOR MEASURING LIQUIDS
                            Filed Jan. 26, 1937              4 Sheets-Sheet 3

INVENTOR.
Carlos J. Bassler
BY Earl E. Moore
ATTORNEY

Oct. 15, 1940.　　　C. J. BASSLER　　　2,217,855
SYSTEM FOR MEASURING LIQUIDS
Filed Jan. 26, 1937　　　4 Sheets-Sheet 4

INVENTOR.
Carlos J. Bassler
BY Earl E. Moore
ATTORNEY

Patented Oct. 15, 1940

2,217,855

UNITED STATES PATENT OFFICE 2,217,855

SYSTEM FOR MEASURING LIQUIDS

Carlos J. Bassler, Alhambra, Calif., assignor, by mesne assignments, to Bank of America National Trust and Savings Association Application January 26, 1937, Serial No. 122,445

8 Claims. (Cl. 73—21)

The metering of fluids produced by oil wells involves more than merely measuring by volume, for volume alone means little to the industry. Oil, like other liquids, changes its volume with changes in temperature and, unless this be taken into account, the true volume of the oil and hence its value is not known. Oil volumes are generally reckoned at 60° Fahrenheit and since this is the usual temperature at which metering values are determined, it is very desirous that meters totalize or indicate the measurement of the oil at 60° Fahrenheit volumes. So many gallons or barrels of oil at 60° Fahrenheit, or any other temperature, has a definite meaning to the industry, and, a meter which can automatically compensate for temperature differences so as to avoid mathematics and possible human error and time, would be of great value to the oil industry. This is true whether the liquids being measured are from a flowing oil well or from some other source.

Oil from a well is often accompanied by water and volatile gases and even solids comprising sand and crushed minerals and rock. Separators when employed under the usual working conditions existing at a well, are not always effective in removing solids and foreign liquids and since in practice, such substances do pass through the meter or meters connected in the oil line, some means is necessary to determine what amount of the substance flowing through the meter is actually oil. Unless the amount of these foreign substances can be determined, the indicated volumes of the meter do not disclose the true amount of the oil passing through the line from the well to the receiving means.

Not only must the temperature differences of the oil be reckoned with and the solids and foreign liquids entrained in the oil but, also the gases entrained with the liquid which have not been eliminated at the separator. Such gases, if not to affect the accuracy of the meter reading must be held under a pressure whereby it is kept in small volumes under the influence, force and characteristics of the oil so as not to be of moment while the oil is being measured. A sufficient back pressure must be maintained from the separator to the meter to keep readily volatile liquids in the liquid state until they pass through the meter. Whenever the separator can be located at a level higher than the meter, sufficient liquid head pressure may be available to operate the meter without any substantial drop of pressure which would cause liquid to change to a gas.

Methods and means to successfully accomplish the desirable measurement of fluids and avoid errors and false reckoning because of the conditions set forth in the above paragraphs have been demonstrated in a practical manner by applicant and have met with the approval of many in the oil industry.

In no sense is this invention to be considered as limited to the measurement of oil; for it is within the scope of this invention to include the measuring of any liquid whether alone or mixed with other liquids or mixed with gases and solids.

An object of this invention is to determine the true measurement of liquids.

Another object of this invention is the provision of means to ascertain the true measurement of liquids regardless of the foreign matter accompanying the liquid.

It is also an object of the invention to accomplish by means the true measurement of liquids as of a predetermined temperature.

A further object of the invention is to treat the gases accompanying the liquid to be measured in a manner that the presence of the gases will not affect the accuracy of the meter reading in liquid values.

A still further object is to ascertain the true measurement of liquids while compensating for volumetric differences due to the temperature of the liquid and also to segregate specimens of the liquid being measured to determine foreign matters therein.

And a still further object of the invention is the design of a system to arrive at the true measurement of liquids regardless of their nature and characteristics.

And a still further object is to automatically maintain a predetermined liquid assuring pressure condition in a pipe line containing a mixture which includes a liquid, prior to metering the liquid.

For purposes of illustration and disclosure of this invention so that one skilled in the art can make and operate same, drawings are presented with specifications describing at least one form in which the invention can be practiced but, it is understood, that this disclosure is not a limiting factor except as limited by the depending claims.

Figures 1, 2:
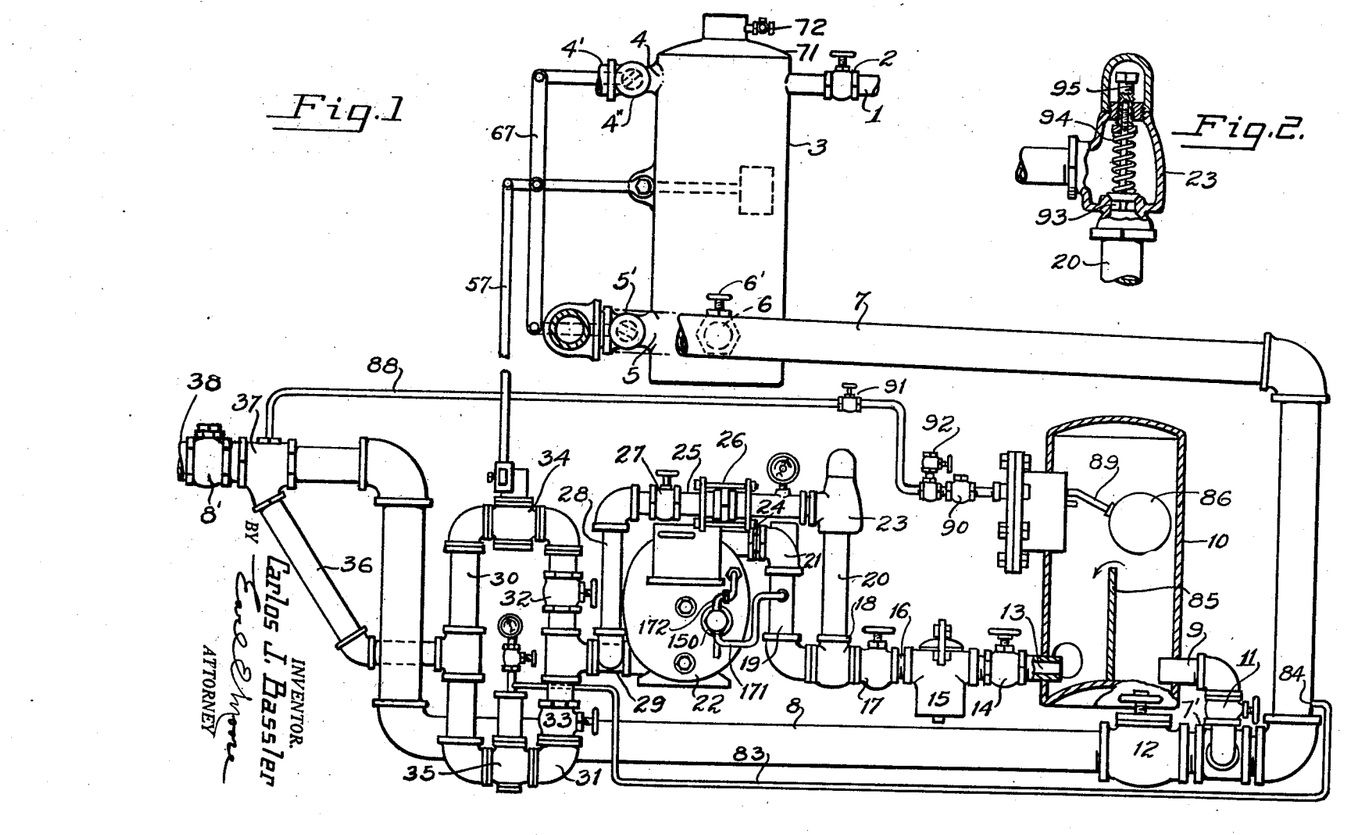
Figure 1 shows the general combination of an oil metering system, parts of some of the elements being broken away for the sake of clarity.
Figure 2 shows an enlarged cross section of a safety valve to protect the measuring means from injury due to high pressures.

Numeral 1, of Figure 1, represents a pipe from an oil well or any other source of oil or, any mixture containing oil such, for instance, the mixture from oil wells in certain localities which not only contain water but various gases and also solids, such as sand. The valve 2 controls the admission of such a mixture to a separator 3 where the gas is permitted to escape at 4 from the mixture at a predetermined pressure through a pipe 4', the pressure usually depending upon the demands of the compressor of the gasoline plant supplied with this gas. The outlet 4 is controlled by a valve 4" which regulates the escape of the gas. Liquid outlets 5 and 6 of the separator (Figure 9) are connected with a pipe line 7 which leads to a by-pass 8 and also to a line 9 leading into a final gas eliminator 10. Manually controllable valves 11 and 12 regulate the flow of the mixture respectively to the eliminator 10 and the by-pass 8. A check valve 8' is provided in the by-pass 8 to prevent back flow of the mixture being metered and, thus prevent its re-metering. Automatic valve 5' and manual valve 6' regulate flow of the mixture from the separator to the pipe line 7. Whenever it is found advantageous to use just the hand valve to draw liquid from the separator, the valve 5' may be closed and the linkage connecting it with the float control disconnected.

An outlet 13 controlled by a valve 14 conducts the mixture from the gas eliminator 10 to a typical sediment trap 15 where much of the remaining solid aggregates are removed from the mixture. At this point, the mixture is usually liquid or nearly all liquid except, when the mixture is from a well where there is a great deal of agitation in which event, much solids will be carried on through the meter. Also, liquid at this point may contain much water, which is not uncommon for wells in some oil districts.

The pipe 16 carries the mixture from the sediment trap through a valve 17 and then to a pipe T-connector 18 which permits the mixture to either enter pipe 19 or pipe 20. The pipe 19 connects with a meter 22 through a spring regulation or check valve 21 and a diaphragm 24 having an orifice. The purpose of the check valve 21 and the orifice is to offer sufficient resistance to the mixture or liquid flowing through the pipe 19 to force specimens of the mixture through a sampling device to be presently described. The valve 21 is a typical regulation valve similar to a spring check valve having means for removing the spring and valve, see Figure 4. The removal of these parts is advisable when the pressures are very high for the reason that the orifice would then be used and the valve parts of no use and therefore, not desired in the flow line. The orifice is of such size that it will assure some flow of fluid through the sampling device when used at high velocities. The diaphragm may, however, be allowed in series with the regulation valve when the system is operating at a relatively low pressure. Regulation valves, like 21, in large sizes are very expensive, hence the object in substituting a relatively inexpensive means, such as a diaphragm containing an orifice.

The pipe 20, safety valve or spring check valve 23, pipe 25, flexible coupling 26, valve 27 and pipe 28 form a by-pass around the meter to protect the meter from dangerously high pressure fluids. The flexible coupling 26 serving to protect the meter from mechanical strains which may be set up in the parts connected to the meter. Unless such a coupling be placed in the by-pass around a meter, expansion in the by-pass, caused by temperature differentials between it and the meter, may place a mechanical strain upon the meter and cause its break down or seriously interfere with its operation. A connector 29 is provided to join the meter by-pass, the outlet of the meter and, two parallel pipe lines 30 and 31; each parallel line having hand control valves 32 and 33 and automatic valves 34 and 35, respectively, to be presently described. The parallel lines are connected to a single pipe line 36 which in turn is connected with the by-pass 8 at 37. The line 38, which may be the yard line or a manifold line connected to other metering units, carries the mixture to its place of delivery which is generally a yard storage tank where it is kept until sold or otherwise disposed of.

The automatic valves 34 and 35 are connected in parallel so that either one may be used, depending upon the pressure of the mixture in line 7; it being preferable to use the valve 34 on low pressures. The function of these valves is to cause a sufficient back pressure on the meter line to prevent vaporization of any of the liquids present in the mixture, so that the meter reading will represent true amounts of liquid.

Figures 9, 10, 11:
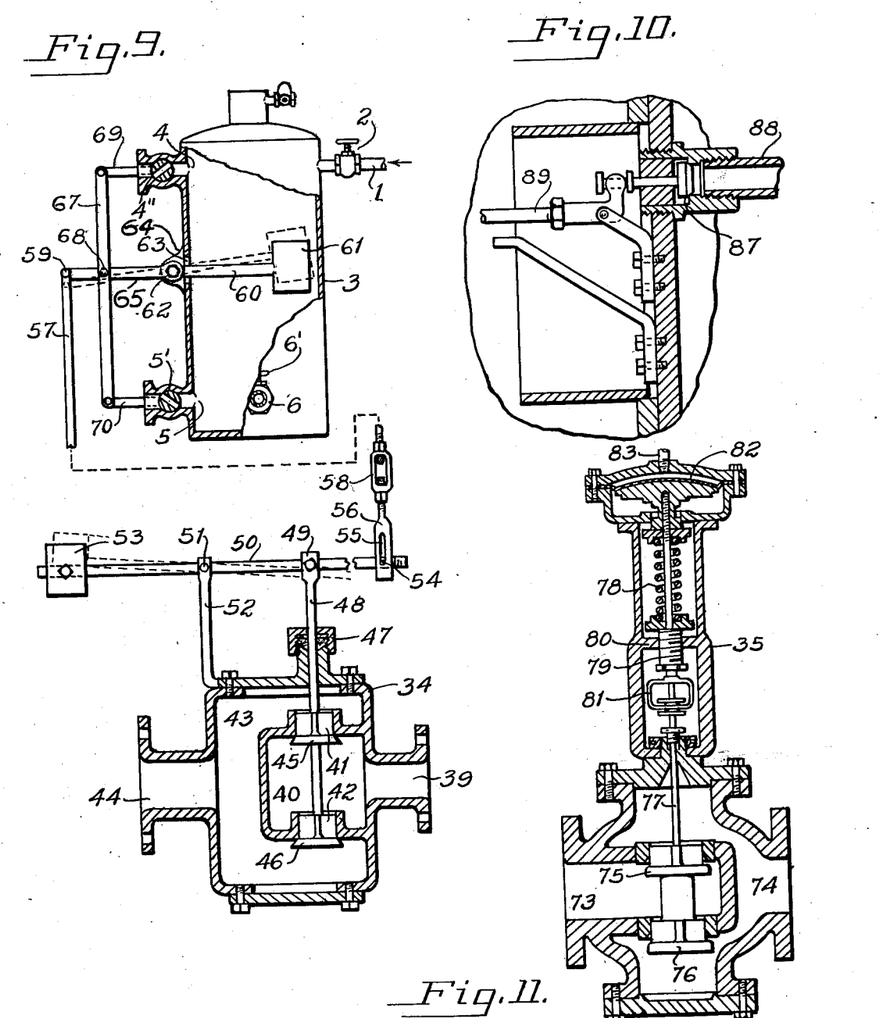
Figure 9 shows a gas and liquid separator and a back pressure valve, mostly in section.
Figure 10 shows a gas outlet detail in section of a final gas eliminator.
Figure 11 shows in section a diaphragm type back pressure valve.

The valve 34 and its means of operation are shown in detail in Figure 9. The valve 34 has an inlet 39 leading to a chamber 40 which has two valves controlled outlets 41 and 42. The valve outlets connect into a common chamber 43 leading to an outlet 44. The valve outlets 41 and 42 are closed by valve heads 45 and 46, respectively, mounted upon a common valve stem 48 which is reciprocable through a packing element 47. The valve stem 48 is pivoted at 49 to a horizontal rod 50 which in turn is pivoted at 51 to a bracket 52. The bracket 52 is supported upon the valve casing. One end of the rod 50 is provided with an adjustable counter weight 53 and the other end with a pin 54 operable in a slot 55 of a flattened section 56 connected to a rod 57 through a turn buckle 58. The rod 57 is pivoted at 59 to a float arm extension 65 operated by the float 61 in the separator 3. The arm 60 is pivoted at 62 so that the vertical movement of the float 61 will cause vertical movement of the rod 57 and the opening and closing of the valve openings 41 and 42. Downward movement of the float 61 causes the rod 57 to move upwardly to close the valves 41 and 42 and vice versa to open the valves. The purpose of the slot 55 will presently be described. A stuffing box 64 is provided on the outer side of the tank 3 to receive the arm 60 which passes through the slot 63. The arm 60 is fixed to a spindle 62 in the stuffing box and passes through a packing gland to receive the rod 65 which is fixed thereto. This arrangement forces the rod 65 to rock with the float arm 60. Gas outlet 4 and liquid outlet 5 are controlled automatically by the movement of the arm 60. Rod 67, pivoted at 68 to the arm 65 is pivotally connected to rods 69 and 70 which control the openings in valves 4'' and 5' respectively. Whenever sufficient oil mixture is admitted into the separator 3 by opening the valve 2 of the pipe line 1, the mixture will rise in the separator and raise the float 61 to press the rod 57 downwardly. The downward motion of the rod 57, however, will not act to open the valves 41 and 42 until an elapse of a predetermined period depending upon the length of the slot 55. Whenever the top wall of slot 55 presses downwardly upon the pin 54 the valves 41 and 42 will open. But before this occurs, however, valve 4'' will approach a closed position and the valve 5' an opened position. The purpose of this is to prevent escape of gas from the mixture when about to be drawn from the separator, and thus, maintain a high pressure in the separator while the oil mixture is being conducted to the meter. The valves 41 and 42 are not opened to operate the meter until valve 4'' is closed and valve 5' fully opened. This delayed action of the valves 41 and 42 assures the mixture reaching the meter without any appreciable drop in pressure to turn liquid into vapor. However, such a control over the valve 5' is not always a necessity. Thus the provision of a second opening 6 controlled by a hand valve 6' so that the mixture can be sent into the line 7 without passing through the valve 5'. The separator is provided with the usual dome top 71 and purging valve 72.

In practice, it has been found to be an advantage to employ a float operated valve like 34 when working with low pressure mixtures, in which event, the separator is situated at a sufficient elevation above the meter and valve to maintain a constant liquid head in the pipe line 7 in order to avoid forming gases. But, however, when higher pressure liquids are to be dealt with, it has been advantageous to employ a valve of the type shown at 35 and shown in detail in Figure 11, which will now be described.

The valve 35 comprises inlet and outlet chambers 73 and 74 respectively with valves 75 and 76 mounted upon a common stem 77 urged upwardly by a spring 78 to close the valves 75 and 76. A flexible diaphragm 82 is operable when pressure is applied above it through a pipe 83 to urge the valves 75 and 76 to an opened position. A screw 79 threaded in wall 80 is adjustable by turn buckle 81 to change the tension upon spring 78 so as to cause the valves to open at some predetermined pressure upon diaphragm 82. The pipe 83 is connected to the pipe line 7 at 84 so as to transmit pressure from that point. The spring 78 is, therefore, adjustable to permit the opening of valves 75 and 76 upon a predetermined pressure in the pipe line 7. The purpose is that the mixture is not to be permitted to flow through the meter until a certain predetermined pressure exists in the pipe line 7 so as to prevent vaporization of the liquids in the mixture.

The gas eliminator 10 is provided to permit the escape of any free gases which may be entrained in the liquid flowing with the mixture in line 7. To permit the escape of this gas, the baffle wall 85 is provided to give the mixture a longer period of flow and time for the free entrained gases to separate from the mixture and rise to the top of the eliminator 10. Whenever there is sufficient liquid in the eliminator 10 to raise the float 86, the valve 87 (see Figure 10) through operation of float arm 89 is closed to prevent liquid escaping to the pipe line 88. However, when the liquid level is at a predetermined and relatively low level, the float will drop permitting the escape of the free gases through the pipe line 88 to the low side of the system in the pipe 38. A regulation valve 90 is provided in the tube 88 to prevent the escape of accumulated gas in 10 unless the pressure is of a sufficient order to prevent appreciable evaporation of the liquid flowing through the eliminator. The tube 88 is provided with a hand valve 91 to close the flow of gas through the tube. A valve 92 is provided to allow escape of the gas to the separator 3 or, to the atmosphere whenever found desirable.

To prevent injury to the meter and its associated parts due to extreme pressure, the by-pass comprising pipes 20, 25 and 28 is provided. The passage of fluids through the by-pass being determined by the spring loaded pop-valve or check valve 23 as shown in detail in Figure 2. The check valve comprises the valve opening 93 urged in closed position by an adjustable spring 94, tension on the spring being controlled by the screw 95. This valve will be set to open only at pressures which are apt to damage the meter and, will force the high pressure mixture to flow around the meter and on through the by-pass to the low side of the check valve 8'. A flexible coupling 26 is inserted in the by-pass to permit distortion of the by-pass line without causing injury to the meter and its connected parts.

Figure 3:
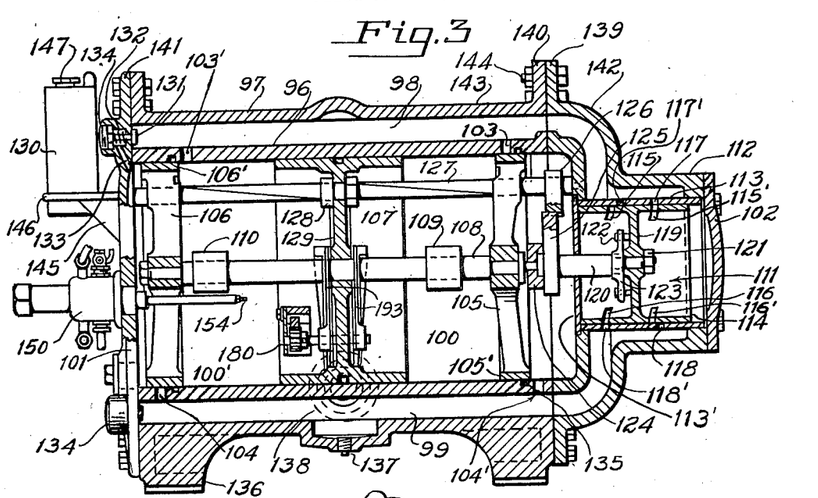
Figure 3 shows a longitudinal cross section of a displacement type meter used in the measuring system.

The meter section shown in Figure 3 is substantially the same as applicant's meter shown in Patent #1,905,549 issued April 25, 1933, and Patent #1,886,364 granted November 8, 1932. It comprises inner and outer concentric casings 96 and 97 respectively, spaced from one another to provide passages 98 and 99 for the flow of the mixture to and from the meter chamber 100. Removable end plates 101 and 102 being provided to close the chamber and completely house the internal parts of the meter. Inlet ports 103 and 103' and outlet ports 104 and 104' are controlled by shiftable valve elements 105 and 106. A piston 107 reciprocates in the chamber 100 by the force of the flowing mixture through the chamber 100 and freely slides upon the guide rod 108 which is fixed to the valve elements 105 and 106. Adjustable stops 109 and 110 are fixed on the guide rod and are forced toward the ends of the chamber 100 by the piston and, when forced toward an end of the chamber the stops force the valve elements 105 and 106 in a common direction to either open or close their respective ports 103, 104', 103' and 104.

In order to carry the piston 107 over a dead center or inactive valve position, and assure reversal of the piston, an auxiliary piston and valve assembly is provided at 111. In order to provide a housing for the auxiliary piston, the outer meter casing 97 has a protruded hub-like portion 112 in which is a ported annular partition 113, forming a cylinder and a sliding surface for an inner ported sleeve 114. The sleeve 114 has two inlet ports 115 and 115' and outlet ports 116 and 116'. The partition has inlet ports 117 and 117' and outlet ports 118 and 118'. The ports of the sleeve and partition are so arranged that one set of inlet and outlet ports on either side of a web 119 will register so as to admit the mixture under pressure from passage 98 to one side of the web and release the mixture on the other side of the web to be free to flow into the passage 99. This being necessary in order to move the web 119 in either direction and force the valves elements 105 and 106 in either direction to carry them over the dead center. A shaft 120, threaded at its end is fixed to the center of the web 119 by a lock nut 121. Pins 122 fixed to the web fit loosely in the slotted ends of a cross-arm member 123. The member 123 is rigidly fixed to the shaft 120 so that it will turn with the shaft 120 and turn web 119 so as to open and close the valved ports in partition 113. The other end of the shaft is journalled or mounted in a common coupler 124 which is fixed to an end of the guide rod 108 so that the rod 108 and shaft 120 transrodlate together. A segment-gear 125 fixed to shaft 120 slides in a meshed relation with a segment-gear 126 which is fixed to a polygonal and spiral shaft 127 to be presently described. Through the rocking of shaft 127, gear 126 will turn the gear 125, shaft 120 and sleeve 111 to a limited degree and cause registration and unregistration of certain ports in the sleeve and partition. A partition 113' divides the auxiliary piston chamber from the metering chamber 100.

A bushing 128 in the web 129 of the piston is internally grooved to fit and slide along the spiral shaft 127 and turn it so as to operate the sleeve valve 111 and, an indicating instrument 130 through a chain of gears not shown. Indicating devices are well known and no attempt will be made here to describe any particular indicating device. Such an indicating instrument, however, having a dial section where the number of volumetric units of mixture passed through the meter are totalized and readable.

To release excess liquid and prevent a liquid jamb from behind the piston 107 when on dead center at the left end of the meter of Figure 3, a small relief plunger 131 is employed. An adjustable resilient means 132 permits the plunger to move upon a predetermined pressure in chamber 100 and thus relieve the chamber 100' of sufficient pressure to permit the shaft 108 to freely enter said chamber and to completely open or close said ports 103', 104' and 103 and 104, respectively. A passage 133 conducts the mixture to the plunger to relieve pressure in chamber 100'. A removable cap 134 may be provided to gain access to the plunger chamber.

Open annular grooves 135 are provided in the casing 96 about the periphery of the valve elements 105 and 106. The purpose of these grooves is to equalize the mixture pressure about the valve surfaces and prevent binding and thus assure smooth and efficient operation of the meter. The valve surfaces 105' and 106' about the perimeter of the valve elements 105 and 106 are not continuous so as to fit closely against the cylinder wall 96 at all points. Portions of the perimeter are receded so as to reduce friction and also to permit oil to reach the grooves 135. The portions of the valve elements which do have sliding friction with the cylinder walls require lubrication and, it has been found in practice advantageous to equalize the lubricant pressure about all surfaces of the valves where there is sliding friction so as to prevent binding and assure free operation. The meter is provided with feet 136 and a drain 137. The outlet of the meter is shown in dotted lines at 138. Heavy flanges 139, 140 and 141 join parts 142, 143 and 101 of the outer casing and are securely held together by numerous bolts 144. A bracket 145 supports a shelf 146 which holds the indicator 130 in a position for easy access to a totalizing device beneath a cover 147.

Figures 4, 5:
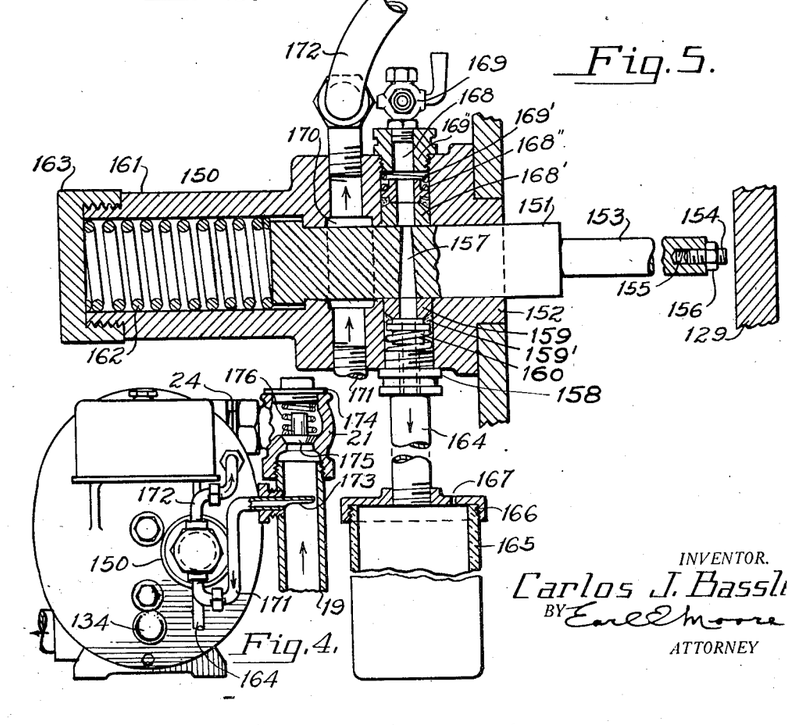
Figure 4 shows an end elevation of the meter; the inlet pipe and associated elements being shown in section.
Figure 5 shows an enlarged cross section of a sampling unit to remove specimens from a flowing liquid in a pipe line.

A sampler 150 is mounted upon one end of the meter for periodically depositing samples of the mixture passing through the metering system. A detail explanation will now be made of the sampler as shown in Figures 4 and 5.

A plunger 151 reciprocates in the block 152 and a rod 153 extends to a predetermined position in the metering chamber 100' and is provided with an adjustable screw 154 threaded into a bore 155 of the rod, the screw being held in place by the lock nut 156. The screw may be extended or retracted to vary the position of contact with the web 129 of the piston.

The plunger 151 is provided with a vertical bore 157 which provides a fair size chamber to receive a charge of the mixture. The size of the chamber 157 will depend to some extent upon the substance being metered. The extension of the block 161 houses a coil spring 162 for urging the plunger inward toward the meter. A screw cap 163 is provided to close the open end of 161. The bore 157 opens into a tube 164 which leads to a jar 165 for deposit of the samples of the mixture. The tube 164 passes through a packing gland 158 having a hard packing 159 and soft packing 159'. A spring 160 holding the hard packing onto the plunger surface. The jar is provided with a cap 166 screwed to the tube 164 and the jar. A vent is provided in the cap at 167 to permit ready flow of the samples through tube 164. The bore 157 also opens into a passage 168 which is controlled by a vent valve 169. Hard packing 168' is held against the plunger surface to prevent leakage of fluid from a chamber 170 into the chamber 157. The packing is resiliently held close to the plunger surface by spring 169' which in turn is held compressed by gland element 169''. A flanged collar 168'' receives one end of the coiled spring and also provides a chamber for soft packing adjacent the hard packing 168'.

Around the plunger 151 is provided an annular chamber 170. This chamber being connected in the flow line comprising the tubes 171 and 172. Whenever the web of the piston 129 pushes the plunger 151 against the tension of the spring 162, the chamber 157 is placed in alignment with the annular chamber 170 to receive ready flow of the mixture from the annular chamber 170. When the piston starts on its return stroke, it releases the plunger 151, the spring forcing the chamber 157 into alignment with passages 168 and 164. In this position, the mixture drops by gravity into the jar 165.

The tube 171 (Figure 4) enters the flow line of pipe 19 and is extended across the diameter of the pipe 19. The lower half of this part of the tube 171 being removed as shown at 173 so as to form a pod-like opening to carry away samples from across the entire flow line 19 which results in the taking of a true cross-section sample of the mixture flowing in pipe 19. The other pipe 172 enters the metering chamber via of passage 98 and discharges the mixture therein to be recorded along with the main flow of the mixture.

A regulation or check valve 21 is provided in the main flow line 19 to provide a differential of pressure between pipe 19 and the metering chamber. A sufficient differential pressure being maintained to assure a free flow of the mixture through the sampler 150. The check or pressure differential valve 21 is of the usual construction having the valve 175 and spring 176 which is compressed by a cap 174. The spring 176 being held at such a compression to give the desired pressure differential for the operation of the sampler. The spring and valve are readily removable. The spring may be substituted by any other size spring should a greater or lesser pressure differential be desirable.

An orifice disc 24 is shown in series with the regulation or check valve 21. The orifice is of a large size for use with high velocity mixtures and will not interfere with the operation of the check valve which is used only on relatively low velocities.

Figure 6:
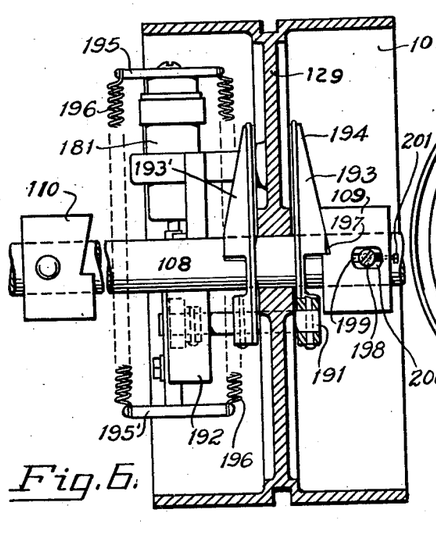
Figure 6 shows a temperature compensating unit as mounted upon the piston of the meter.
Figure 7:
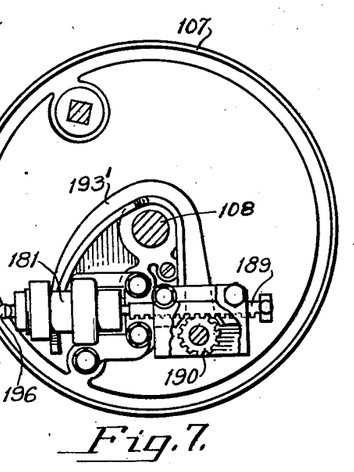
Figure 7 shows the temperature compensator in elevation looking from the left in Figure 6.
Figure 8:
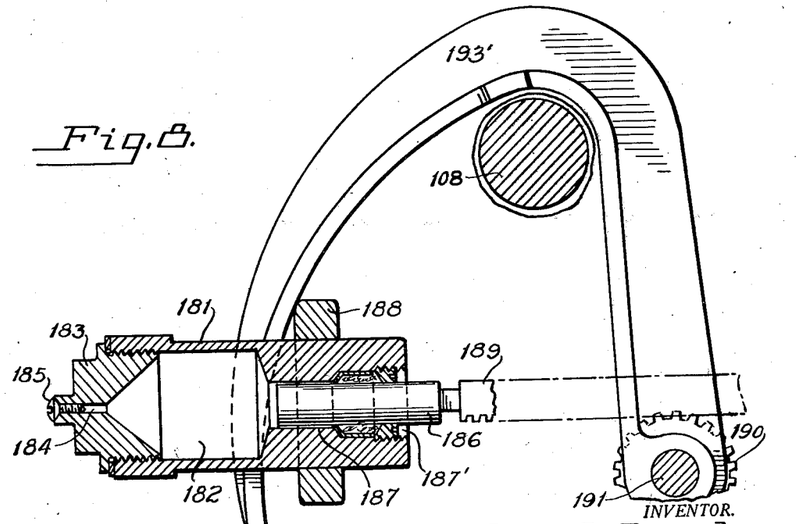
Figure 8 shows a detail of the temperature compensator as connected to a thermostat, the thermostat being shown in section.

The temperature compensating device 180 shown in Figures 6, 7 and 8 comprises a thermostat 181 which is composed of a block having a chamber 182 closed by a cap 183. The cap 183 being threaded so as to be removable for placing fluid in the chamber 182. The fluid is placed in the chamber 182 when said chamber is in an upright position, so that it can be completely filled before the cap 183 is screwed down. A vent 184 is provided in the cap and is closed by a screw 185. When the chamber 182 is loaded with the fluid, the screw 185 is removed before the cap is screwed down. The vent 184 permitting the air to escape and thus permit the complete filling of the chamber with the fluid. The fluid is generally the oil being measured; this has been found the most satisfactory and expedient means in practice. When it is certain that the chamber is completely filled with the fluid, the screw 185 is screwed into the vent. At the other end of the thermostat is a plunger 186 which reciprocates in a bore 187 of the thermostat block. The bore being enlarged at 187' to permit of the usual packing and gland members to prevent escape of the oil from the chamber 182. An annular flange-like bracket 188 is provided to hold the thermostat on to the web of the piston 129. The plunger 186 is fixed to a rack 189 which is meshed to a pinion gear 190 which, in turn, is fixed to a shaft 191 having one end journalled in the housing 192 and a section near the other end journalled in the web 129, of the piston. On both sides of the piston web are two curved radial arms 193 and 193' of the form shown in the drawings. One side of the arms is mitered or tapered at 194 for a purpose to be presently disclosed.

At the outer extreme ends of the thermostat and rack assembly are provided cross arms 195 and 195'. Springs 196 connect the ends of the cross arms as shown so as to urge cross arm 195' and rack 189 and the plunger 186 toward the thermostat chamber so that whenever the fluid in chamber 182 contracts the rack 189 will be retracted and, through the pinion gear 190 place radial arms 193 in a position shown in Figure 8. The stops 109 and 110 upon the shaft 108 are mitered or tapered as shown at 197 to receive the tapered surface 194 of the radial arms. A threaded bolt 198 is held in a threaded bore of the shaft 108 and can be tightly screwed down when the stop is correctly positioned. The stop 109 is adjustable along the shaft 108 by unscrewing the bolt 198 which is slidable in the stop slot 199. The screw head is counter-sunk in the slot 200 of the stop. An adjustable screw 201 pivotally attached to bolt 198 is threaded in the stop 109 and may be turned so as to move the stop axially along the shaft 108. The purpose of moving the stop 109 is to set it at the proper point so that the valves will open and close at the proper time, this feature providing a micro-adjustment. The purpose of the tapered surfaces 194 and 197 is to vary the amount of the piston displacement in the cylinder 100. The amount of displacement depending upon the temperature of the mixture being measured, and the position of the mitered surfaces 194 and 197. It can be seen, therefore, that the position of the sliding surfaces 194 and 197 will depend upon the temperature of the fluid in chamber 182 of the thermostat which in turn will depend upon the temperature of the oil mixture being measured.

*Operation*

A mixture containing oil, gases, and possibly sand, conditions often encountered in some oil wells in certain districts, enters pipe 1 of the separator 3 and accumulates in the separator. When the mixture first enters the separator the float 61 is down, valve 4" open and 5' closed. Free gas from the mixture flows through the opening 4 into a pipe 4' which conducts the gas to a gasometer or any other place for temporary storage or immediate use. The pipe 4' generally is provided with a check or back pressure valve so that the gas will be taken off at a certain pressure, the pressure generally being of an order that will not permit further vaporization of the liquids contained in the mixture.

As the mixture rises in the separator, the float 61 will rise and gradually close the valve 4" and gradually open the valve 5' to allow the mixture to pass through the pipe 7. The mixture in pipe 7 flows to a T-connector 7' where the mixture may flow through either the main by-pass 8 or a pipe 9 into a final gas eliminator, depending upon whether the valves 11 or 12 are open or closed. In this case, the valve 12 is closed, and the valve 11 open, permitting the mixture to flow into the gas eliminator and overflow the partition 85 to enter the pipe 13 on its way to the meter. In the gas eliminator, the mixture will rise and raise the float 86 and close the gas take-off valve 87. Under normal operation, the level of the mixture will vary to some extent in the gas eliminator, low levels permitting free entrained gas from the liquid of the mixture to escape through the outlet pipe 88 and into the low side of the system to pipe 38 providing the pressure is great enough to open the check valve 90. So as not to cause vaporization of the liquid and create any additional gases, the valve 90 is set so as not to open unless a liquid sustaining pressure exists in the gas eliminator. The valve 90 also serves to prevent possible generated high pressures in the pipe 38 from backing into the gas eliminator and possibly returning metered mixture thereto. The valve 92, however, may be used to pass the gas to the atmosphere by closing the valve 91, if desirable. The purpose of closing the valve 87 upon a high level of the mixture in the eliminator is to prevent the escape of liquid around the meter.

From the eliminator, assuming valves 14 and 17 to be opened, the mixture will pass into the sediment trap 15 where solids may be deposited and then, flow on to the T-connector 18 where the mixture may pass through either pipes 20, 25 and 28 should the pressure be too high to be safely carried by the meter, or, if the pressure is of an order that the mixture can safely be passed through the meter, the check or safety valve 23 will remain closed, and the mixture will pass into the meter to displace the piston 107.

The mixture will enter the manifold passage 98 of the meter and pass through the opening 103' and by its pressure, force the piston 107 toward the right as shown in Figure 3.

The piston will move until the boss of the radial arm 193 engages the stop 109. This translation of the piston 107 will, by virtue of the bushing 128, turn the spiral shaft 127 which, in turn, will rock the gears 126 and 125 to open valve port 115 to permit the mixture to enter the chamber to the left of the web 119 and force the web 119, shaft 120 and guide rod 108 to the right. The mixture-pressure will, therefore, urge the pistons 107 and 111 in the same direction, to the right as shown in Figure 3, and their combined effort will be of sufficient order to readily switch the valve elements 105 and 106 to the right and reverse the operation of the meter. This combined effort takes place when the piston 107 pushes the stop 109 toward the right with the aid of the piston 111 which is, at the same time, urged toward the right by the fluid pressure to the left of web 119. Shafts 108 and 120 are coupled together, therefore, movement of either the stops or the web 119 must shift both shafts together as a single element. The coupling or socket 124 permits the two shafts to relatively turn in respect to each other upon their axes to a limited degree. When opening 115 registers to permit entry of the mixture to one side of web 119, valve port 116' will be opened to permit mixture to the right of web 119 to pass out of its chamber and into the outlet manifold 99 and thence to the T-connector 29 toward the yard line. The mixture-force applied against the web 119 aids the force applied to the left of the piston web 129 to carry the valve elements 105 and 106 past their respective dead center positions so as to close inlet valve 103' and outlet valve 104' and open valves 103 and 104 so as to allow the mixture to force the piston web 129 to the left. When this complete operation has taken place, the spiral shaft 127 has caused the indicating, in the instrument 130, of the volume necessary to displace the piston web 129 in its stroke from left to right. The volumes may be indicated in gallons or barrels.

Upon the opening of valves 103 and 104, the mixture will enter the chamber to the right of the web 129 and urge it to the left until the boss of the radial arm 193' engages the stop 110. At this point, the web 119 of the auxiliary piston had been rotated sufficient to open the valves 115' and 116 so that the mixture-pressure in the chamber to the right of the web 119 will aid the pressure to the right of the web 129 and together, their combined pressure will urge the stop 110 to the left and force the closing of valves 103 and 104 and the opening of the valves 103' and 104' to cause reverse operation of the meter.

The plunger 131 is provided to make room for the excess liquid to the left of the web 129 caused by the shaft 108 when it is forced to the left end of the meter, in order to prevent a liquid jamb.

In order to indicate the volumes of the mixture as of a predetermined temperature, preferably 60° Fahrenheit, some of the oil to be measured has been placed in the thermostat chamber 182 while at a temperature of 60° F. and of a sufficient quantity to completely fill the chamber. This oil will contract and expand in direct proportion to the contraction and expansion of the mixture being metered. Therefore, if the mixture being metered happens to be warmer than 60° Fahrenheit, the liquid in chamber 182 will expand forcing the plunger 186 and rack 189 to the right, as shown in Figure 8, turning the gear 190 clockwise and likewise the radial arms 193 and 193'. This will permit the piston web 129 to be further displaced than it would have been had the radial arms remained as shown in Figure 8, the displacement being in direct proportion to the increase in volume of the liquid over its volume at 60° F., the boss of the radial arm 193 riding downwardly upon the mitered surface 197 of the stops, as shown in Figure 6. In Figure 6, however, the maximum downward position of the arms 193 and 193' are shown.

Should the oil being measured be cooler than 60° F. the reverse action will take place as described above, making the stroke of the piston web 129 shorter instead of longer in direct proportion to the temperature difference between 60° F. and the temperature of the mixture being measured.

The check or regulatory valve 21 provided in the pipe 19 creates a differential of pressure between the pressure in pipe 19 and the metering chamber for the purpose of urging some of the mixture to pass through the sampling device 150. As shown in Figures 4 and 5, a continuous small stream of the mixture will flow through the tubing 171 into the sampler and out through the tubing 172 into the metering chamber. At every other stroke of the piston 107, the web 129 will engage the extension 154 of the sampler plunger 151, forcing it to the left to aline the chamber 157 with the flow tubes 171, 172. When the piston starts toward the other end of the cylinder, spring 162 will force the plunger to its original position and aline the chamber 157 with the passages 168 and 164 and permit the sample of the mixture to fall into the repository 165. The valve 169 is preferably open to permit atmospheric pressure above the mixture-sample to aid its fall into the depository. In the depository, the mixture will stratify, the solids comprising mostly sand will settle to the bottom and the water to the top with the oil in between.

At low pressures it has been found to be more practical to employ the float control valve 34 with the delayed action feature caused by the slot 55. The purpose of the delayed action is to prevent the opening of the valve 34 until the mixture from the separator 3 has reached the meter in order to assure a liquid head pressure on the meter and hence the formation of very little gas in the metering line. Of course, if the valve 34 is to be used, hand valve 33 must be closed and valve 32 open.

An opening 6 in the separator 3 is shown controlled by a hand valve 6' to permit the escape of liquid into the line 7 when it is desired to dispense with the automatically controlled valve 5'. Upon the use of the opening 6, the rod 67 may be disconnected from the valve 5' without impairing the operation of the connected parts to the float arm 60, particularly the operation of the gas escape valve 4".

At high pressures it has been found advantageous to employ the diaphragm type valve 35. This is especially true when it is desired to retain all of the oil values in the liquid form. In the use of this valve, a tubing 83 transfers pressure from the pipe 7 to the top of the diaphragm 82 as shown in Figure 11. Pressure exerted upon the diaphragm will push it downwardly against the compression of spring 78 and open valves 75 and 76 to permit the flow of the mixture through the meter and into the pipe 36 which carries the mixture to the yard line 38. This is assuming that valve 32 is closed and valve 33 is opened. By adjusting the element 79, the compression of the spring 78 may be varied so that the valves will not open until a certain predetermined pressure exists in the line 7. By this means, much of the liquid, which would with ordinary valves, flash into gas, would be preserved in the liquid state.

From the foregoing, it can be seen that applicant has invented a measuring system that is suitable for determining the true amount of oil, regardless of its condition, as it comes from an oil well.

I claim:

1. In a measuring system for liquid mixtures which may contain foreign substances, a common pipe line, including a gas separator, meter, and a back pressure valve connected in series in said common pipe line, a sampling mechanism, temperature compensating means in the meter to effect the measuring of the liquids at a predetermined temperature, means extending from said sampling mechanism into the meter to receive power for operation of the mechanism, means extending across and internally of the pipe line ahead of the back pressure valve and connected to said sampling mechanism, said last means and said mechanism taking intermittent and predetermined quantities of the mixtures and depositing same in a receptacle, means connected to the back pressure valve to regulate its opening with respect to pressure conditions prevailing in the pipe line prior to measurement of the liquid.

2. In a system for determining the amount of oil in a mixed fluid; a meter having an inlet passage and an outlet passage, an inlet duct connected to the inlet passage, a back-pressure device in the duct, a sampling means having an egress pipe connected to the inlet passage of the meter and an ingress pipe connected to the inlet duct on the high pressure side of the device so that the back-pressure device will cause a part of the mixed fluid in the inlet duct to flow directly through said pipes and sampling means.

3. A system for determining oil amounts in a fluid including a meter having inlet and outlet passages, inlet and outlet ducts connected to said inlet and outlet passages respectively, a sampling device supported by and controlled by the meter, ingress and egress flow pipes connected with said device, the ingress pipe carrying fluid from the inlet duct and the egress pipe carrying fluid to inlet passage of the meter, back-pressure means in the inlet duct to cause flow of some fluid through the said ingress and egress pipes, said ingress pipe passing through a wall of the inlet duct and across the interior thereof, said ingress pipe within the inlet duct having a lower portion thereof removed so as to cause portions from cross-sections of the flowing fluid through the inlet duct to enter the ingress pipe and flow through the sampling device.

4. In a measuring system for liquids, a pipe line for conducting liquids, a meter and a back pressure valve connected in the pipe line, said valve being connected on the low pressure side of the meter so as to maintain the liquid passing through the meter at predetermined pressures, a sampling mechanism having means connected with said pipe line to receive liquid therefrom, said means including a baffle extending interiorly of the pipe line to cause a representative portion of the cross-section of the liquid flowing through said pipe line to enter said sampling mechanism, means connected with the mechanism extending into the meter to receive power therefrom and to periodically operate the mechanism and cause it to periodically force a charge of liquid into a depository, temperature compensating means in the meter to effect the measuring of the liquid at a predetermined temperature, means connected to the back pressure valve and to the pipe line on the high pressure side of the meter to regulate the opening of the valve with respect to pressure conditions prevailing in the pipe line ahead of the meter.

5. A sampling device in combination with a meter for measuring liquids, a housing for enclosing the sampling device, a bore in said housing having a plunger for reciprocation therein, openings in said housing having connection with the bore, the first one of the openings having connection with an ingress pipe leading to the liquid to be measured and the second one of the openings having connections with an egress pipe to carry liquid from the housing, a third opening in the housing having connection with the bore and spaced from said other openings, the third opening having connection with a receptacle, a passage in said plunger adapted to connect said first and second openings and receive a charge of liquid therein, means to cause the plunger to move and place the passage in alinement with the third opening for delivery of the charge.

6. The apparatus recited in claim 5 including: an annular chamber recessed in said bore connecting the first and second openings so that a continuous flow of liquid can be maintained through the ingress and egress pipes.

7. In a system for measuring oil; a separator having a gas outlet and an oil outlet with a float therein, a valve for said gas outlet and a valve for said oil outlet, said float having connection with said valves and arranged to open the oil outlet and close the gas outlet when the float is elevated and vice versa when the float is down, a meter, a back pressure valve, a pipe line connecting said oil outlet, meter and back pressure valve in series, said meter and back pressure valve being located at a level well below the separator so as to provide a constant liquid head pressure upon the meter to avoid vaporization of the liquid, means connecting the float with the back pressure valve for opening and closing it, a device coupled in said means for delaying the opening of the back pressure valve so that when the float is elevated, full opening of the oil outlet will occur before opening of the back pressure valve.

8. In a system for measuring liquids which may contain undesirable liquids and solids, a pipe line having one end connected to the liquids to be measured, and another end connected to means to receive the measured liquids, a meter, a sampling mechanism and a back pressure valve connected in said pipe line, said meter and mechanism being situated between the back pressure valve and the end of the line connected to the liquids to be measured, means in the meter to effect the measuring of the liquids at a predetermined temperature, power delivery means connected between the meter and mechanism for operating it, scoop-like means crossing an interior portion of the pipe line designed to receive a representative portion of the liquids and solids flowing through the pipe line, duct means extending from the scoop-like means to the sampling mechanism, said last means and mechanism taking intermittent and predetermined quantities of the liquids from the line and depositing same in a receptacle, means connected to the valve to regulate its opening in accordance to liquid conditions prevailing in the pipe line prior to measurement.

CARLOS J. BASSLER.